No. 830,993. PATENTED SEPT. 11, 1906.
P. HANNAGAN.
SNOW PLOW.
APPLICATION FILED JAN. 31, 1906.

2 SHEETS—SHEET 1.

Witnesses.
Oscar F. Hill
Edith J. Anderson

Inventor:
Paul Hannagan
By Chas. F. Randall
Attorney.

No. 830,993. PATENTED SEPT. 11, 1906.
P. HANNAGAN.
SNOW PLOW.
APPLICATION FILED JAN. 31, 1906.

2 SHEETS—SHEET 2.

Witnesses:
Oscar F. Hill
Edith J. Anderson.

Inventor:
Paul Hannagan
by Chas. F. Randall
Attorney.

UNITED STATES PATENT OFFICE.

PAUL HANNAGAN, OF LAWRENCE, MASSACHUSETTS.

SNOW-PLOW.

No. 830,993.  Specification of Letters Patent.  Patented Sept. 11, 1906.

Application filed January 31, 1906. Serial No. 298,771.

*To all whom it may concern:*

Be it known that I, PAUL HANNAGAN, a citizen of the United States, residing at Lawrence, in the county of Essex, State of Massachusetts, have invented a certain new and useful Improvement in Snow-Plows, of which the following is a specification, reference being had therein to the accompanying drawings.

The invention relates to snow-plows of the class employed for clearing snow from sidewalks and roadways, and while in part it refers more particularly to snow-plows such as are especially adapted for use for clearing snow from gutters and the like places it also is applicable in part to other snow-plows.

The invention consists in a gutter-plow or the like having the means hereinafter explained with reference to the drawings for supporting the outer end of the transversely-extending draft-bar and the corresponding shaft and in addition preventing the plow from tipping over or overturning in consequence of the weight of the said shaft, or of pressure thereupon or upon the outer end of the draft-bar, or when the landside of the plow rides upon a mass of snow or ice or is otherwise uplifted.

The invention further consists in various improvements in snow-plows of the general class aforesaid, which are hereinafter described, and pointed out in the claims.

The invention is illustrated in the accompanying drawings, in which—

Figure 1:
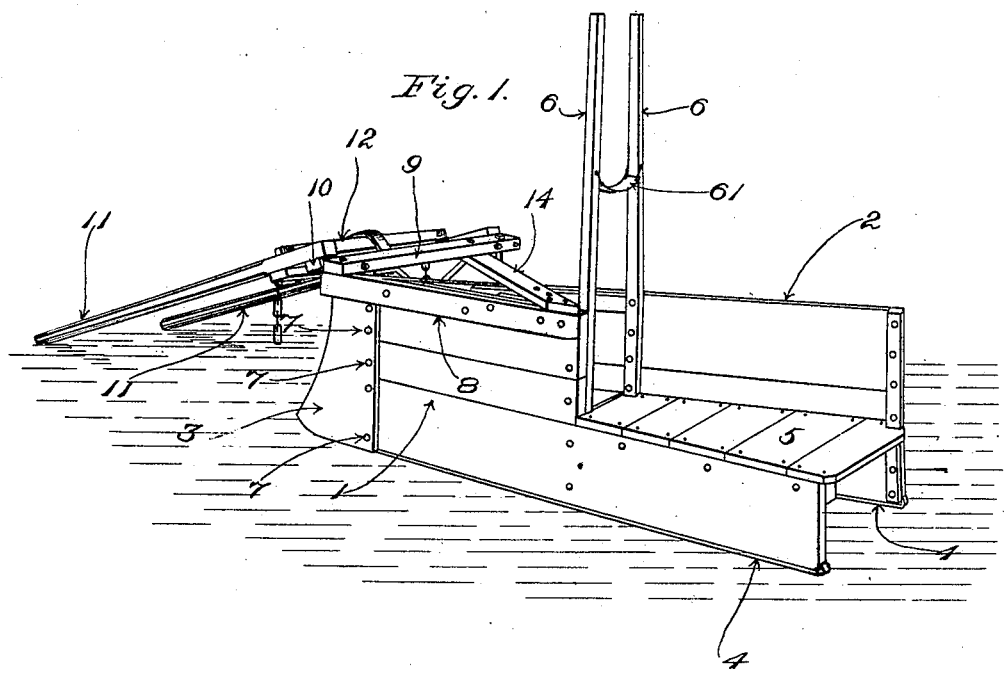
Figure 2:
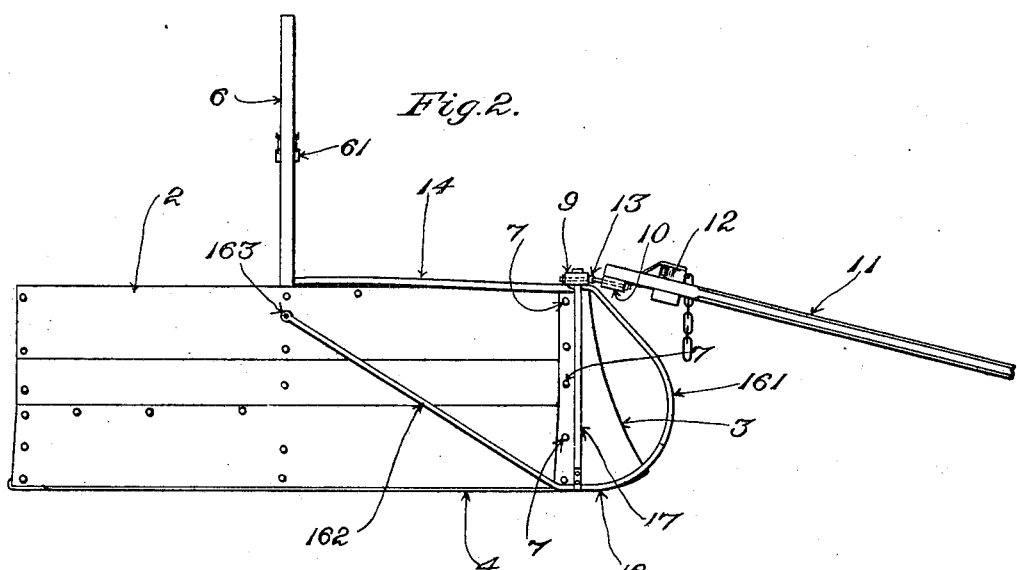
Figure 3:
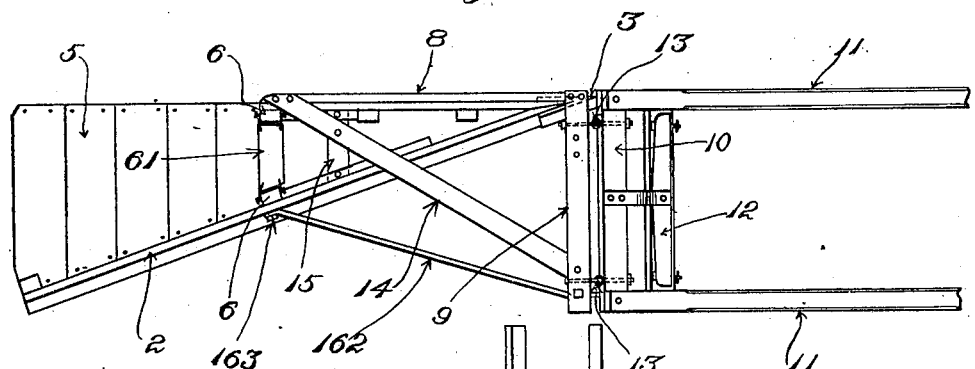
Figure 4:
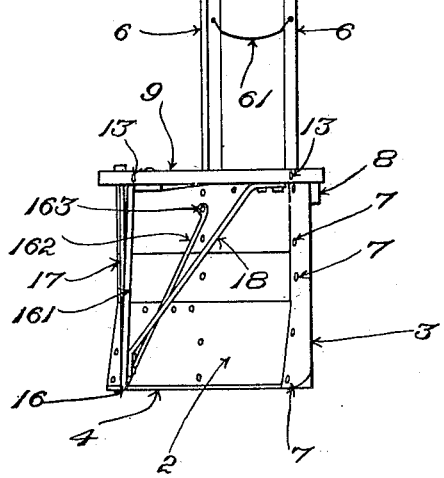
Figure 5:
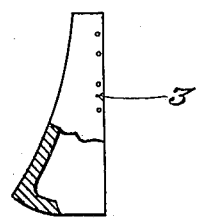

Figure 1 is a perspective of a gutter-plow embodying the invention looking at the landside thereof. Fig. 2 is an elevation of the said plow looking at the opposite side thereof. Fig. 3 shows the plow in plan. Fig. 4 is a front elevation of the plow with the shafts, &c., removed. Fig. 5 is a detail view of the point detached, partly broken away.

Having reference to the drawings, at 1 is the landside of the plow shown therein, at 2 the opposite side thereof, and at 3 the point. The respective side portions 1 and 2 are formed of planks, as usual, and shod with iron, as at 4 4. As usual in the case of a gutter-plow, the landside 1 extends parallel with the line of movement of the plow to enable such portion of the plow to work close in against the edge stone or curbing of a sidewalk, while the opposite side 2 of the plow is inclined, as shown, to deflect the snow outward.

At 5 is a platform extending horizontally from one side portion to the other and upon which the person who drives the horse or horses by which the plow is drawn may stand.

At 6 6 are posts extending upward from the opposite sides of the plow and by which the driver when standing upon the said platform may steady himself to keep from falling or losing his position. The said posts are bolted, respectively, to the respective sides 1 and 2 of the body of the plow. Usually I form the rear portion of the landside, for about one-half of the length thereof, of less height than the fore part thereof and also than the inclined side 2 to correspond with the position of platform 5 in order to render it convenient for the driver to step upon or from the said platform. A seat 61, extending across from one post to the other and secured thereto, will be provided in some cases. Such seat may consist of a strap, as shown, or the like, slung to the two posts, or a rigid seat may be attached to the latter. The point 3 is formed as shown best in Figs. 3 and 5. It is composed of cast-iron, V-shape in horizontal cross-section, with the lower portion thereof projecting somewhat farther forward than the upper portion thereof. The base of the forward portion of the point is closed or solid, as indicated in Fig. 5, and is upturned somewhat, as shown, to obviate tendency to enter and dig into ice or catch upon uneven surfaces or against stones or the like projecting from the paving, so as to arrest the plow or impede the progress of the same. The diverging side flanges of the point receive between them the forward ends of the planks of the sides 1 and 2, as shown by Fig. 3. The said ends are beveled off on their inner faces, the beveled surfaces of the planks of one side of the plow making contact with those of the other side thereof and the tip ends of the planks extending to the forward limit of the interior opening of the point. Bolts 7 7 7, &c., fasten the planks in place between the flanges of the point. This construction gives strength and stiffness to the forward portion of the body of the plow and supports the point 3 securely.

At 9 is the draft-bar, to which the moving force is applied in the use of the plow. This draft-bar is arranged in connection with the forward end of the plow. It being necessary that the horse which is employed to draw the plow along should walk in front of the inclined side of the plow the said draft-bar is secured by its inner end to the fore part of the plow and extends outward at right angles with respect to the landside across in front of the said inclined side. The attachment of the draft-bar 9 to the plow is effected by bolting the said inner end thereof to a side bar or draw-bar 8, which is applied to the landside at the top thereof and bolted thereto. The means of transmitting the said moving force to the said draft-bar consists in the present instance of the cross-bar 10, having connected therewith the shafts 11 11 and whiffletree 12, the said cross-bar 10 being connected with the draft-bar 9 by means of eyebolts 13 13 linked together.

In order that the force communicated to the draft-bar 9 may be transmitted to the body of the plow from both ends of the draft-bar equally without racking the connection between the draft-bar and the body of the plow, the outer end of the draft-bar has bolted thereto the forward end of a bar 14. The latter bar extends diagonally rearward across the top of the body of the plow. It rests upon a cross-bar 15 and the side bar 8 and is bolted to the said cross-bar and side bar, as shown.

I provide for obviating tendency of the body of the plow to overturn, as in consequence of the weight of the outwardly-extending draft-bar 9 and the outer shaft 11, or of weight superadded to the outer portion of the draft-bar or the said outer shaft, and also in case the landside should become uplifted, as in consequence of passing over a mass of snow or ice or other elevation in its path, as follows: At 16 is an outrigger-runner which I employ in connection with the outer end of draft-bar 9. It is formed of a runner-iron which is bent to shape. One end of the said runner-iron is bolted to the said end of the draft-bar 9. The adjoining portion 161 of the runner-iron extends downwardly and first bows forwardly and then is bent rearwardly to form the runner. A portion 162 of the runner-iron, which continues rearward from the runner proper, extends diagonally upward and inward to an intermediate portion of the length of the inclined side 2 of the body, to which side it is bolted, as at 163. Such diagonally-extending portion constitutes a brace by which the outrigger-runner is stayed in the direction from front to rear, and also transversely to some extent. Stiffness vertically in the support of the outer end of the draft-bar is secured by means of an upright post 17, which is secured at its lower end to outrigger-runner 16 and its upper end to the said end of the draft-bar. Lateral support is afforded to the outrigger-runner by means of a diagonal brace consisting of a rod 18, Fig. 4, occupying an inclined position with its lower end attached to the lower end of post 17 and its upper end attached to the inner portion of the draft-bar 9.

I claim as my invention—

1. In a snow-plow, in combination, the body comprising essentially the landside and the inclined side, the draft-bar projecting transversely in front of the said inclined side, the diagonal bar connecting at the rear end thereof with the said body and at the forward end thereof with the outer portion of the said draft-bar, and the outrigger-runner connected with the said outer portion of the draft-bar and having the brace extending rearward to and connecting with the said body.

2. In a snow-plow, in combination, the body, the draft-bar projecting transversely, the diagonal bar connecting at the rear end thereof with the said body and at the forward end thereof with the outer portion of the said draft-bar, the outrigger-runner connected with the said outer portion of the draft-bar and having the brace extended rearward to and connecting with the said body, and the inclined brace whereby the outrigger-runner is stayed from displacement transversely.

3. In a snow-plow, in combination, the body, the draft-bar projecting transversely, and the outrigger-runner supporting the outer end of the said draft-bar and having the rearward extension connected with the said body.

4. In a snow-plow, in combination, the body, the draft-bar projecting transversely, the outrigger-runner supporting the outer end of the said draft-bar and having the rearward extension connected with the said body, and the inclined brace whereby the outrigger-runner is stayed from displacement transversely.

5. In a snow-plow, in combination, the body, the draft-bar projecting transversely, the outrigger-runner iron having the upwardly-bent forward end thereof connected with the outer portion of the said draft-bar and the rear end thereof connected with the said body and means to brace the outrigger-runner transversely.

6. In a snow-plow, in combination, the body, the draft-bar projecting transversely, the diagonal bar connecting at the rear end thereof with the said body and at the forward end thereof with the outer portion of the said draft-bar, and the outrigger-runner connected with the said outer portion of the draft-bar.

7. In a snow-plow, in combination, the body constructed to effect the lateral removal of the snow, and having a support on which the driver of the plow may stand, the upright posts 6, 6, oppositely located with reference to each other to support and steady the driver, and the seat connected with the said upright posts.

8. In a snow-plow, in combination, the converging sides of the body, and the metal point, V-shaped in horizontal cross-section, with the lower portion thereof projecting somewhat farther than the upper portion thereof, and having the base of the forward portion of the point upturned and closed or solid.

9. In a snow-plow, in combination, the converging sides of the body, and the metal point, V-shaped in horizontal cross-section, receiving between the diverging side flanges thereof the forward ends of the said sides, the said point having the lower portion thereof projecting somewhat farther forward than the upper portion thereof, and having the base of the forward portion of the point upturned and closed or solid.

In testimony whereof I affix my signature in presence of two witnesses.

PAUL HANNAGAN.

Witnesses:
    CHAS. F. RANDALL,
    EDITH J. ANDERSON.